(12) United States Patent
Ngo et al.

(10) Patent No.: US 6,464,407 B1
(45) Date of Patent: Oct. 15, 2002

(54) OPTICAL CONNECTOR HAVING A FERRULE WITH ALIGNMENT AND SEALING FEATURES

(75) Inventors: Hung Viet Ngo, Harrisburg; Timothy W. Houtz, Etters; Drew A. Demangone, Latrobe, all of PA (US)

(73) Assignee: Berg Technology, Inc., Reno, NV (US)

( * ) Notice: Subject to any disclaimer, the term of this patent is extended or adjusted under 35 U.S.C. 154(b) by 1 day.

(21) Appl. No.: 09/687,766

(22) Filed: Oct. 13, 2000

(51) Int. Cl.[7] .................................................. G02B 6/36
(52) U.S. Cl. ........................................................ 385/83
(58) Field of Search .............................. 385/83, 78, 59, 385/60

(56) References Cited

U.S. PATENT DOCUMENTS

| | | | |
|---|---|---|---|
| 3,864,018 A | 2/1975 | Miller | 350/96 C |
| 4,046,454 A | 9/1977 | Pugh, III | 350/96 C |
| 4,657,341 A | 4/1987 | Sammueller | 350/96.22 |
| 4,762,390 A | 8/1988 | Finzel | 350/96.21 |
| 4,772,088 A | 9/1988 | Finzel | 350/96.21 |
| 4,778,243 A | 10/1988 | Finzel | 350/96.21 |
| 4,818,058 A | 4/1989 | Bonanni | 350/96.2 |
| 4,836,638 A | 6/1989 | Finzel | 350/96.21 |
| 5,265,184 A | 11/1993 | Lebby et al. | 385/132 |
| 5,535,296 A | 7/1996 | Uchida | 385/89 |
| 5,620,634 A | 4/1997 | Shahid | 264/1.25 |
| 5,671,315 A | 9/1997 | Tabuchi et al. | 385/137 |
| 5,853,626 A | 12/1998 | Kato | 264/1.25 |
| 5,974,214 A | 10/1999 | Shacklette et al. | 385/50 |
| 5,984,534 A | 11/1999 | Elderstig et al. | 385/90 |
| 6,132,105 A * | 10/2000 | Konda et al. | 385/65 |
| 6,210,047 B1 * | 4/2001 | Grois et al. | 385/83 |

\* cited by examiner

*Primary Examiner*—Brian Sircus
*Assistant Examiner*—Brian S. Webb
(74) *Attorney, Agent, or Firm*—Perman & Green, LLP

(57) ABSTRACT

An optical connector comprising a ferrule, optical conductors, and epoxy. The ferrule has an optical conductor receiving area and guide pin receiving areas. The ferrule comprises at least two ferrule members having shaped surfaces on outer lateral sides which form the guide pin receiving areas. The ferrule members comprise mating projections and recesses proximate the outer lateral sides and between the optical conductor receiving area and the guide pin receiving areas which form epoxy seals. The optical conductors having portions located in the optical conductor receiving area. The epoxy is located in the optical conductor receiving area to connect the portions of the optical conductors to -the ferrule. The epoxy seals prevent the epoxy from flowing into the guide pin receiving areas.

15 Claims, 5 Drawing Sheets

US 6,464,407 B1

OPTICAL CONNECTOR HAVING A FERRULE WITH ALIGNMENT AND SEALING FEATURES

BACKGROUND OF THE INVENTION

1. Field of the Invention

The present invention relates to optical connectors and, more particularly, to a ferrule assembly with optical conducts and alignment guide pins.

2. Brief Description of Prior Developments

U.S. Pat. No. 4,046,454 discloses an optical fiber connector having a ferrule chip with grooved, a ferrule cover without grooves, and a compliant layer. U.S. Pat. No. 4,657,341 discloses a ferrule plate with auxiliary grooves for alignment of two carrier plates. U.S. Pat. No. 4,818,058 discloses guide pins and beveled edges on ferrule blocks which contact the guide pins. U.S. Pat. No. 5,984,534 discloses a method and device for a waveguide connector.

A problem exists with conventional optical connectors in that guide pins need to be relatively precisely positioned relative to optical conductors to prevent losses from mated optical connectors. Ferrule members need to be precisely manufactured to exacting tolerances with increases the costs of manufacturing. Ferrule members need to be precisely assembled with each other which also increases the costs of manufacturing. There is a desire to reduce the costs associated with manufacturing optical connectors, but still provide relatively precise alignment of optical connectors. There is a desire to decrease the costs associated with manufacturing ferrule members and to increase the mateability tolerances between ferrule members.

SUMMARY OF THE INVENTION

In accordance with one embodiment of the present invention, an optical connector is provided comprising a ferrule, optical conductors, and epoxy. The ferrule has an optical conductor receiving area and guide pin receiving areas. The ferrule comprises at least two ferrule members having shaped surfaces on outer lateral sides which form the guide pin receiving areas. The ferrule members comprise mating projections and recesses proximate the outer lateral sides and between the optical conductor receiving area and the guide pin receiving areas which form epoxy seals. The optical conductors having portions located in the optical conductor receiving area. The epoxy is located in the optical conductor receiving area to connect the portions of the optical conductors to the ferrule. The epoxy seals prevent the epoxy from flowing into the guide pin receiving areas.

In accordance with another embodiment of the present invention, an optical connector is provided comprising optical conductors; a ferrule and guide pins. The ferrule comprises ferrule members having guide surfaces which cooperate to form guide pin receiving areas. A first one of the ferrule members directly contacts portions of the optical conductors to align center axes of the optical conductor portions along a common plane. The guide pins are located in the guide pin receiving areas against the guide surfaces of the ferrule members. The guide pins have center axes aligned with the center axes of the optical conductor portions along the common plane. The ferrule members have projections and recesses with parallel contact surfaces angled relative to the common plane which contact each other and insure that the guide surfaces are located relative to each other to locate the center axes of the guide pins in the common plane.

In accordance with one method of the present invention, a method of assembling an optical connector comprising steps of locating portions of optical conductors between two ferrule members; locating projections in mating recesses of the ferrule members; forming seals at contacting surfaces of the ferrule members' projections and recesses to seal an interior epoxy receiving area between the ferrule members from guide pin receiving areas of the ferrule members; and locating epoxy in the interior epoxy receiving area, the seals formed at the projections and recesses preventing the epoxy from flowing into the guide pin receiving areas.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
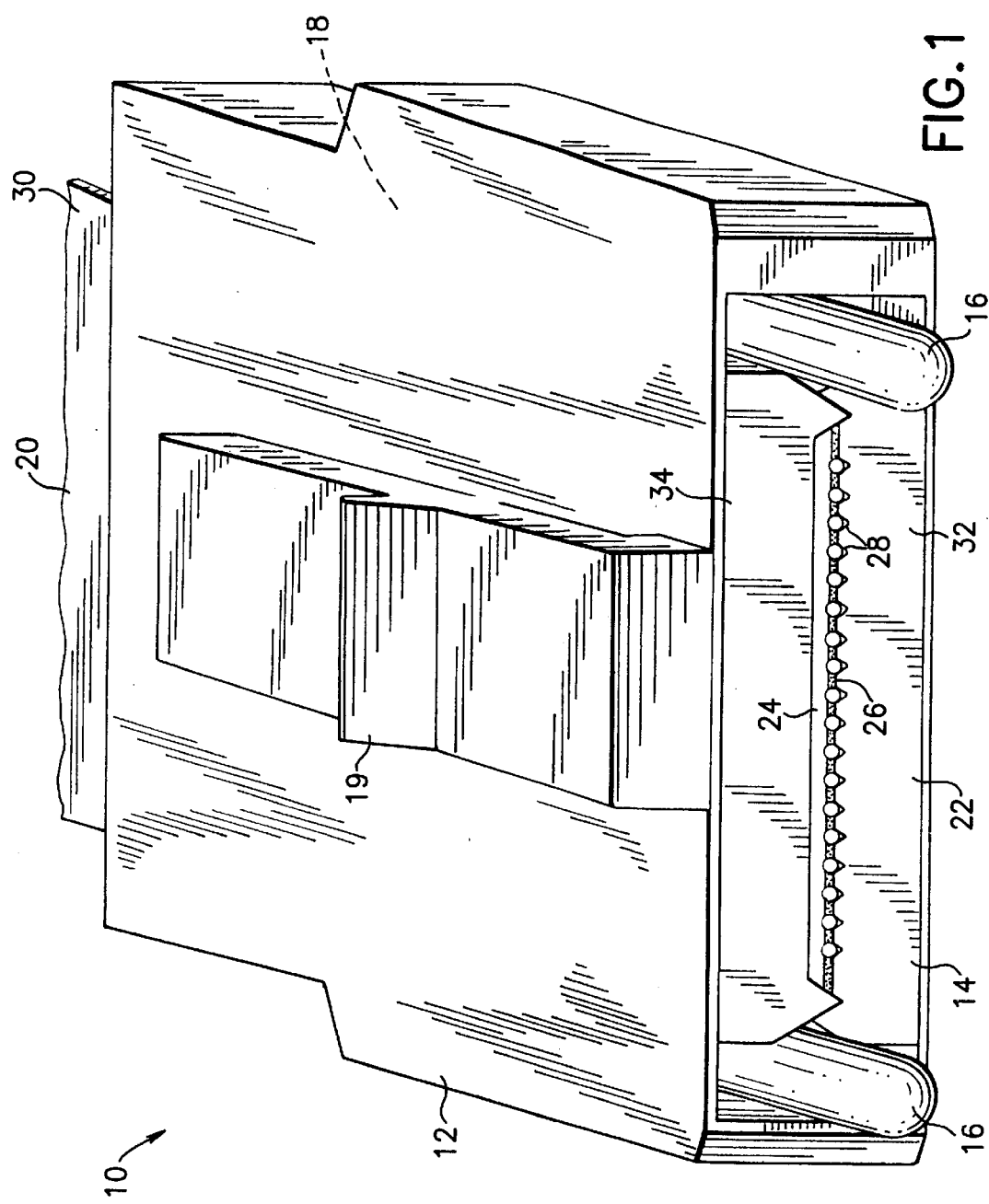
FIG. 1 is a perspective view of an optical connector incorporating features of the present invention.

Referring to FIG. 1, there is shown a perspective view of an optical connector assembly 10 incorporating features of the present invention. Although the present invention will be described with reference to the single embodiment shown in the drawings, it should be understood that the present invention can be embodied in many alternate forms of embodiments. In addition, any suitable size, shape or type of elements or materials could be used.

In the embodiment shown, the optical connector assembly 10 generally comprises a housing 12, a ferrule and optical conductor subassembly 14, and guide pins 16. The housing 12 is preferably comprised of molded plastic. However, any suitable type of housing could be provided. The housing 12 can have the guide pins 16 stationarily connected thereto. However, in an alternate embodiment, such as with an optical connector adapted to mate with the connector 10, guide pins need not be provided. The connector assembly also preferably comprises a spring 18 located in the housing 12 and biasing the subassembly 14 in a forward direction. However, the subassembly 14 can be pushed back into the housing 12 upon mating with a cooperating mating optical connector (not shown). The housing 12 also preferably comprises a latch 19 to connect the housing to an optical connector adapter (not shown). However, the latch 19 need not be provided or any suitable latch or adapter connection means could be provided.

Referring also to FIGS. 2–5, the ferrule and optical conductor assembly 14 generally comprises an optical conductor member 20, a ferrule 22, a compliant layer 24, and flowable material 26, such as epoxy. The optical conductor member 20 generally comprises a row of optical conductors 28, such as optical fibers, and a cover 30. However, any suitable optical conductor member(s) could be used.

The ferrule 22 generally comprises two ferrule members 32, 34 comprised of a suitable material such as Silicon. However, the ferrule could be comprised of more than two ferrule members and any suitable types of materials could be used. As seen best in FIG. 3, the first ferrule member 32 generally comprises a front section 36 and a rear section 38. The front section 36 comprises a top side 40 having a plurality of optical conductor locating grooves 42 and two locating/sealing recesses 44. The optical conductor locating grooves 42 preferably comprise a general V shape. The locating/sealing recesses 44 also preferably comprise general V shapes. However, other shapes could be provided. The rear section 38 comprises a recess 46 between two lateral side walls 48. The outer lateral sides 50 of the first ferrule member 32 have surfaces 52 which, in the embodiment shown, are angled. The second ferrule member 34 generally comprises a front section 54 and a rear section 56. The front section 54 generally comprises a bottom side 58 having a flat section 60 and two projections 62 on opposite sides of the flat section 60. The projections 62 preferably have a general V shape. However, any suitable shape(s) could be provided. The rear section 56 has a recess 64 between two side walls 66 (see FIG. 4). However, in alternate embodiments the rear sections 38 and 56 need not be provided. The second ferrule member 34 also comprises outer lateral sides 68 which have surfaces 70. In this embodiment the surfaces 70 are flat and angled.

The compliant layer 24 is preferably comprised of a relatively soft material which is adapted to deform when pressed by the second ferrule member 34 against exposed ones of the optical fibers 28. As seen best in FIG. 2A, the compliant layer 24 can deform around the top sides of the individual exposed fibers 28. The compliant layer 24 may also comprise adhesive. The epoxy 26 is preferably injected into an area between the top surface 40 of the first ferrule member 32 and the bottom surface of the compliant layer 24. When the epoxy hardens, it bonds the assembly 14 together. As used herein the term "epoxy" is intended to mean any suitable type of flowable material which can harden or semi-harden to connect the assembly 14 together. As seen best in FIGS. 4 and 5, the two rear section recess 46,64 form a strain relief area 72 which receives the epoxy 26. In an alternate embodiment, the area 72 could receive a rubber boot that surrounds the fiber ribbon and forms a strain relief. The epoxy 26 surrounds a portion of the fibers 28 and cover 30 and bonds the ferrule members 32, 34 together. The epoxy 26 in the area 72, thus, forms a strain relief for the optical conductor member 20 with the ferrule 22.

Figure 3:
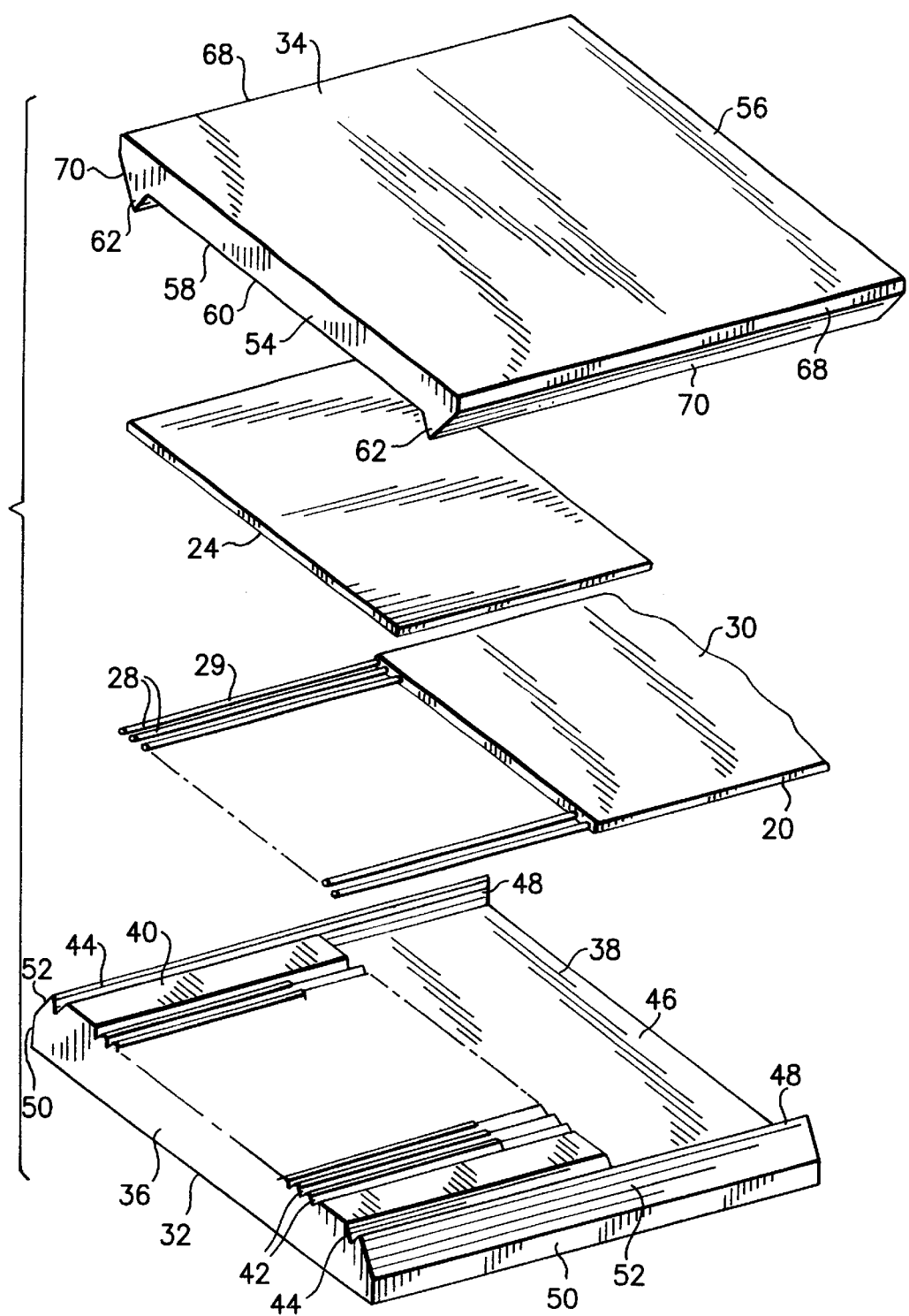
FIG. 3 is an exploded perspective view of the ferrule and optical conductor subassembly shown in FIG. 2.
Figure 4:
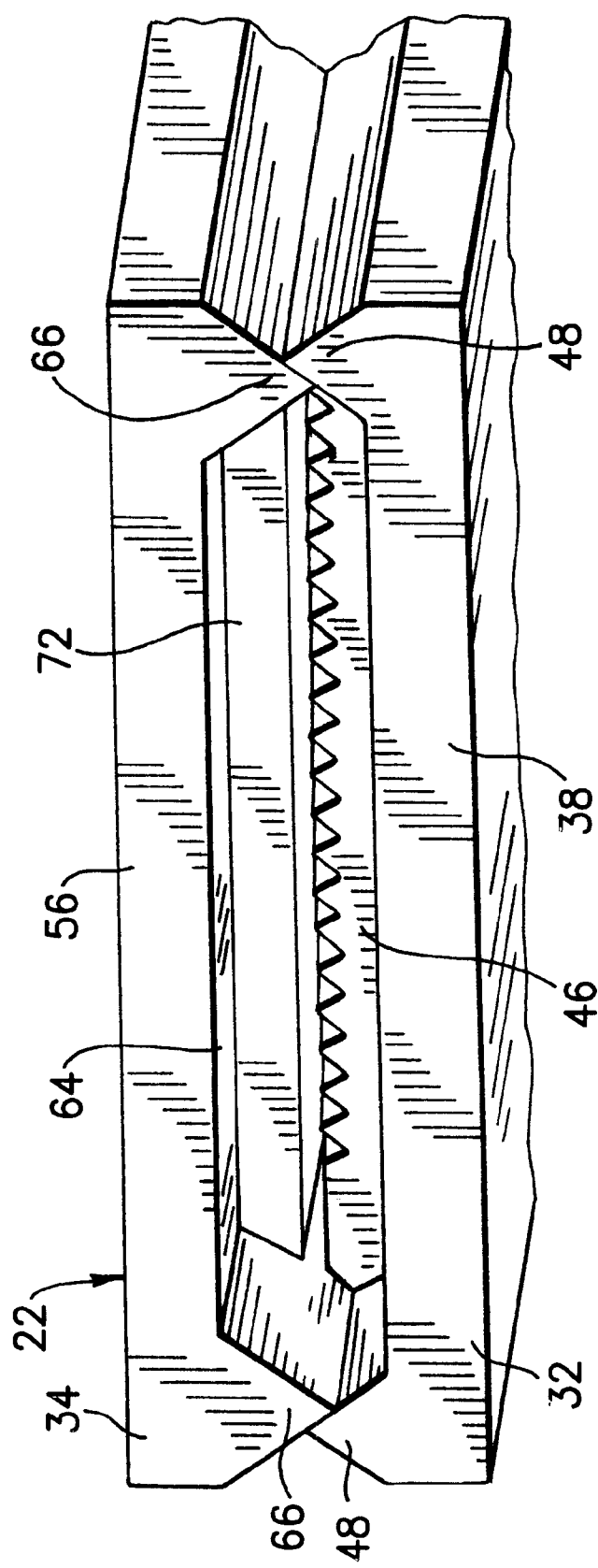
FIG. 4 is a partial perspective view of the rear ends of the ferrule members shown in FIG. 3.

When the ferrule and optical conductor assembly 14 is assembled, the cover 30 is preferably removed from front portions 29 of the optical fibers 28 as shown in FIG. 3. The optical fiber portions 29 are located in individual respective ones of the optical conductor grooves 42 at the top surface of the first ferrule member 32. The shapes of the portions 29 and grooves 42 provide a dual contact as indicated by arrows A. The compliant layer 24 is placed against the opposite sides of the portions 29. The second ferrule member 34 is placed against the compliant layer 24 and pressed towards the first ferrule member 32. The compliant layer is compressed at the fiber portions 29 and snugly seats the portions 29 at areas A.

Figure 2:
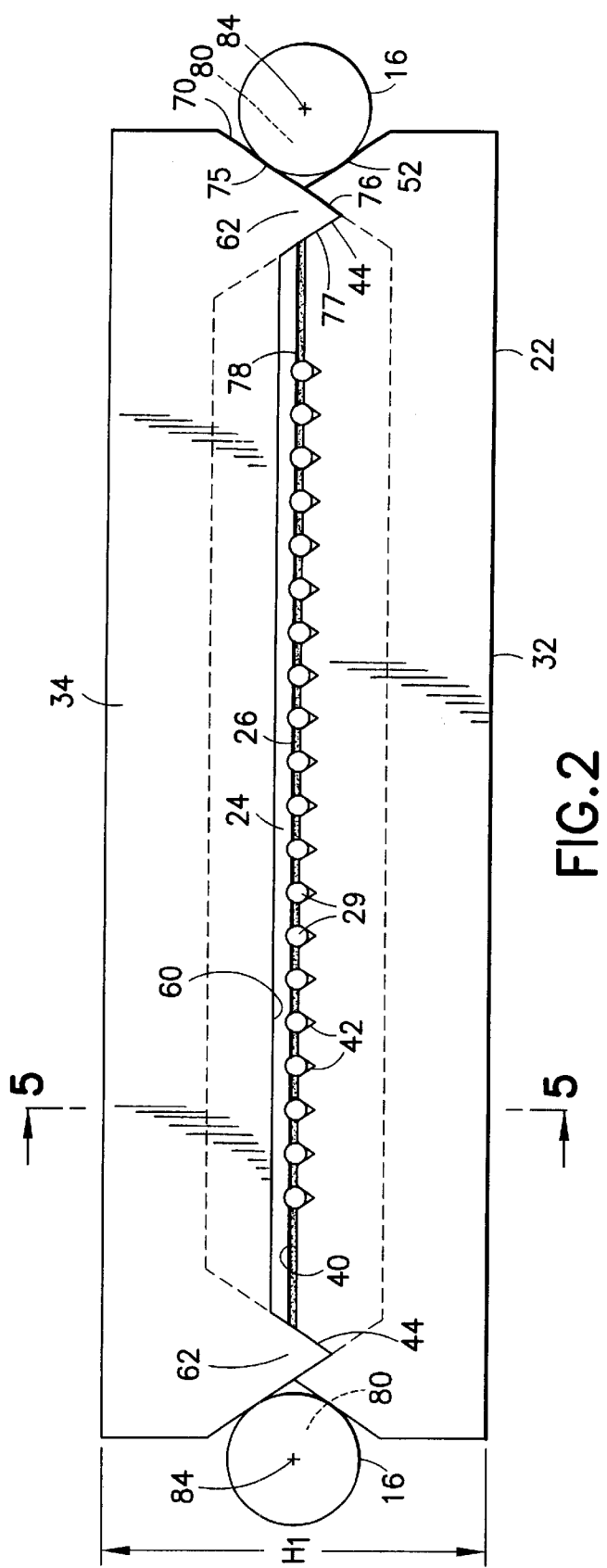
FIG. 2 is a front elevational view of ferrule and optical conductor subassembly and the guide pins shown in FIG. 1.
Figure 2A:
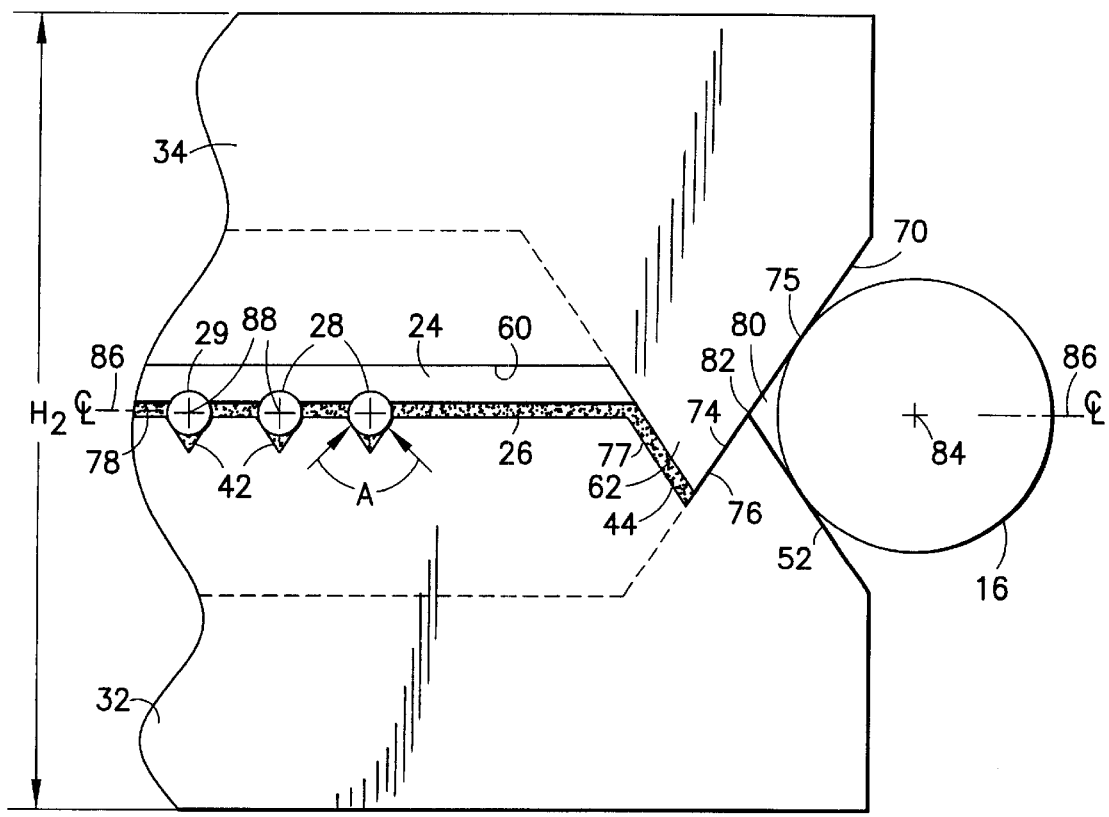
FIG. 2A is an enlarged view of one end of the ferrule and optical conductor subassembly and one of the guide pins shown in FIG. 2.
Figure 5:
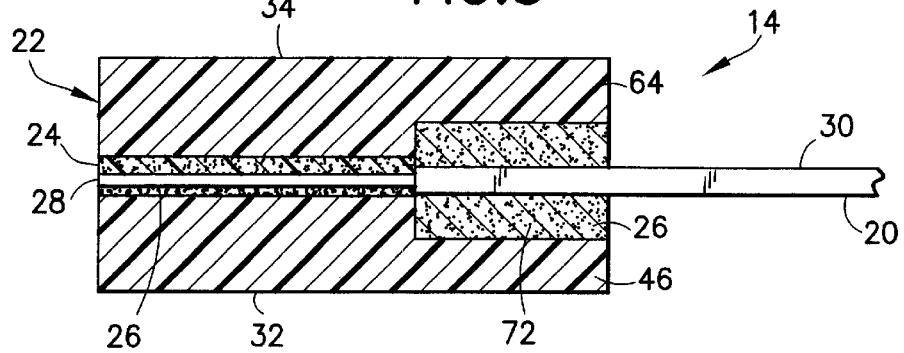
FIG. 5 is a cross-sectional view of the ferrule and optical conductor subassembly shown in FIG. 2 taken along line 5—5.

As the two ferrule members 32,34 are moved towards each other, the projections 62 move into the recesses 44. More specifically, the surfaces 70 have a section 74 which form contact surfaces for directly contacting the contact surfaces 76 of the locating/sealing recesses 44. The respective pairs of contact surfaces 74,76 are preferably flat and parallel to each other. The contact surfaces 74 face outward and the contact surfaces 76 face inward such that the projections 62 wedge in between the surfaces 76. The projections 62 can make a snug bottoming-out fit in the recesses 44; contacting both sides 76,77 of the recesses 44 as shown in FIG. 2. The present invention also allows the two ferrule members 32, 34 to be snugly connected to each other without the projections 62 bottoming-out in the recesses or without both projections 62 contacting the inner sides 77 of the recesses 44. More specifically, the present invention can accommodate manufacturing tolerances in the ferrule members 32, 34 which might result in two different subassemblies 14 having their two ferrule members 32, 34 being connected to each other at different relative heights. However, the present invention allows both subassemblies 14 to still provide the centerline axes 84, 88 of the optical fiber portions 29 and pins 16 to be in the same plane relative to the ferrule member 32 even though the ferrule members 34 may be at different relative heights. With the present invention the projections 62 might only contact the outer ones 76 of the side surfaces in each recess 44 as shown in FIG. 2A. This might be done intentionally, such as by recessing the surface 77 and/or the surface 77, or might merely occur due to a manufacturing tolerance variance. The present invention allows the two ferrule members 32,34 to be connected to each other at different relative heights $H_1$, $H_2$, as illustrated by FIGS. 2 and 2A, with the compliant layer 24 still seating the optical fiber portions 29 at the same positions on the first ferrule member 32. The pairs of contact surfaces 74,76 can contact each other to form seals regardless of the relative heights of the ferrule members 32,34 relative to each other. Preferably, the pairs of contact surfaces 74,76 contact each other along a majority of their heights. The seals form barriers between the interior area 78 of the ferule 22 and guide pin receiving areas 80 located at the lateral sides of the ferrule 22. Once the seals are formed, the epoxy 26 is injected into the interior area 78. The seals at contact surfaces 74,76 prevent the epoxy from flowing into the guide pin receiving areas 80. This prevents the epoxy 26 from blocking or otherwise interfering with locating of the guide pins 16 in the guide pin receiving areas 80.

As noted above, the ferrule 22 comprises guide pin receiving areas 80 at its lateral sides. The areas 80 are formed by the recesses created by the inwardly sloped surfaces 52,70 of the ferrule members 32,34, respectively. In this embodiment the surface 52 and the section 75 of the surface 70 form guide surfaces for directly contacting the pins 16. The guide surface 75 is a common flat surface with the contact surface 74. Because the contact surfaces 74,76 always contact each other regardless of the relative heights of the ferrule members' connection to each other, the guide surfaces 52,75 are always at the same angle relative to each other, and the apex 82 of their conjunction is always at the same location. Thus, when the pins 16 are located in the guide pin receiving areas 80 against the guide surfaces 52,75, the center axes 84 of the guide pins 16 are always located at the same position relative to the first ferrule member 32. More specifically, as illustrated in FIG. 2A, the surfaces 52,75 are preferably designed to center the center axes 84 of the cross-sectionally circular pins 16 in a plane 86. The first ferrule member 32 has also preferably been designed to center the center axes 88 of the optical conductor portions 29 in the same common plane 86. So long as the surfaces 74, 76 contact each other at both recesses 44, the center axes 84,88 are in the common plane 86 regardless of variations in the relative heights of the ferule members 32,34; which might occur from manufacturing tolerances.

With the present invention, by providing the center axes 84,88 in a common plane, there is greater predictability for making an aligned fiber-to-fiber center alignment with a mating optical connector. In an alternate embodiment the center axes 84 and 88 need not be in a common plane. Features of the present invention could be provided with the center axes 84 and 88 in non-common planes so long as the ferrule provides a fixed relationship of the center axes 84 and 88 relative to each other regardless of variations of the connection of the two ferrule members 32,34 with each other. With the present invention the alignment critical dimensions for the pins 16 and fibers 28 can be controlled by merely one ferrule member; the first ferrule member 32. In alternate embodiments the surfaces 74,75,76,52 could have any suitable shapes so long as the preferable sealing function and the preferable pin-to-fiber alignment is maintained irrespective of variations caused by ferrule member connection tolerance.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An optical connector comprising:
   a ferrule having an optical conductor receiving area and guide pin receiving areas, the ferrule comprising at least two ferrule members having shaped surfaces on outer lateral sides which form the guide pin receiving areas, wherein the shaped surfaces are located relative to each other to locate center axes of cross-sectionally circular guide pins, which are located against the shaped surfaces, in a common plane with center axes of the optical conductor portions, and wherein the ferrule members comprise mating projections and recesses proximate the outer lateral sides and between the optical conductor receiving area and the guide pin receiving areas which form epoxy seals; and
   optical conductors having portions located in the optical conductor receiving area,
   wherein the seals separate the optical conductor receiving area from the guide pin receiving areas.

2. An optical connector as in claim 1 wherein the projections and recesses have parallel contact surfaces which contact each other and are angled relative to the common plane.

3. An optical connector as in claim 1 wherein a first one of the ferrule members comprises optical conductor receiving grooves having individual optical conductor portions therein.

4. An optical connector as in claim 3 further comprising a compliant layer of material pressed by a second one of the ferrule members against the optical conductor portions.

5. An optical connector as in claim 3 wherein the first ferrule member comprises the recesses.

6. An optical connector as in claim 5 wherein a second one of the ferrule members comprises the projections.

7. An optical connector as in claim 1 wherein the projections and recesses have parallel contact surfaces which contact each other.

8. An optical connector as in claim 7 wherein the contact surfaces of a first pair of the projections and recesses are angled relative to a second pair of the projections and recesses.

9. An optical connector comprising:
   optical conductors;
   a ferrule comprising ferrule members having guide surfaces which cooperate to form guide pin receiving areas, a first one of the ferrule members directly contacting portions of the optical conductors to align center axes of the optical conductor portions along a common plane; and
   guide pins located in the guide pin receiving areas against the surfaces of the ferrule members, the guide pins having a center axes aligned with the center axes of the optical conductor portions along the common plane,
   wherein the ferrule members have projections and recesses with parallel contact surfaces angled relative to the common plane which contact each other and insure that the guide surfaces are located relative to each other to locate the center axes of the guide pins in the common plane, wherein the contact surfaces of the projections and recesses wedge the projections towards a center of the ferrule, and
   further comprising means for connecting the ferrule members to each other at different heights with the center axes of the guide pins and optical conductor portions being the common plane.

10. An optical connector as in claim 9 wherein the connecting means comprises a compliant layer of material pressed by a second one of the ferrule members against the optical conductor portions.

11. An optical connector as in claim 10 further comprising epoxy connecting the optical conductor portions to the ferrule, and wherein the projections and recesses form epoxy seals between an interior area of the ferrule and the guide pin receiving areas.

12. An optical connector as in claim 9 wherein the first ferrule member comprises the recesses and a second one of the ferrule members comprises the projections.

13. An optical connector as in claim 9 wherein the projections and recesses have general elongate V shapes.

14. An optical connector as in claim 9 wherein the guide surfaces and respective contact surfaces of a second one of the ferrule members each comprise a common uniform surface.

15. An optical connector as in claim 9 wherein the contact surfaces of the first ferrule member are parallel to respective ones of the contact surfaces of a second one of the ferrule members.

* * * * *